US007637202B2

(12) United States Patent
Davey

(10) Patent No.: US 7,637,202 B2

(45) Date of Patent: Dec. 29, 2009

(54) HYDRAULIC MOTOR/PUMP

(75) Inventor: Garth Davey, Blairgowrie Vic (AU)

(73) Assignee: Hydrostatic Design Technology Pty Ltd, Blairgowrie Vic ( * ) Notice: Subject to any disclaimer, the term of this patent is extended or adjusted under 35 U.S.C. 154(b) by 170 days.

(21) Appl. No.: 10/582,961

(22) PCT Filed: Dec. 15, 2004

(86) PCT No.: PCT/AU2004/001765

§ 371 (c)(1),
(2), (4) Date: Jan. 16, 2007

(87) PCT Pub. No.: WO2005/057007

PCT Pub. Date: Jun. 23, 2005

(65) Prior Publication Data

US 2007/0151443 A1 Jul. 5, 2007

(30) Foreign Application Priority Data

Dec. 15, 2003 (AU) .............................. 2003906932

(51) Int. Cl.
*F03C 1/053* (2006.01)
*F16H 21/20* (2006.01)

(52) U.S. Cl. ............................................ 92/72; 91/492

(58) Field of Classification Search ..................... 92/72; 91/491, 492, 497, 498
See application file for complete search history.

(56) References Cited

U.S. PATENT DOCUMENTS

| | | | | |
|---|---|---|---|---|
| 1,227,780 | A * | 5/1917 | Graves | 91/498 |
| 1,974,961 | A * | 9/1934 | Johnson | 91/492 |
| 2,316,115 | A * | 4/1943 | Thompson | 91/497 |
| 3,081,708 | A * | 3/1963 | Nyman et al. | 91/492 |
| 3,174,436 | A * | 3/1965 | Wanner | 91/492 |
| 3,610,106 | A * | 10/1971 | Cavalieri | 92/72 |
| 4,236,874 | A * | 12/1980 | Sisk | 417/315 |
| 5,368,448 | A * | 11/1994 | Maruno et al. | 91/492 |
| 5,588,339 | A | 12/1996 | Dulger | |
| 6,840,151 | B1 * | 1/2005 | Barker et al. | 92/72 |

FOREIGN PATENT DOCUMENTS

| | | | |
|---|---|---|---|
| DE | 37 11 729 | A1 | 10/1988 |
| DE | 39 36 649 | A1 | 5/1991 |
| EP | 0 271 456 | B1 | 5/1992 |
| GB | 2 219 836 | A | 12/1989 |
| JP | 11190326 | | 7/1999 |
| SU | 1002-611 | A | 3/1983 |
| SU | 1775007 | A3 | 11/1992 |
| SU | 1789750 | A1 | 1/1993 |
| SU | 1825399 | A3 | 6/1993 |

* cited by examiner

*Primary Examiner*—Thomas E Lazo
(74) *Attorney, Agent, or Firm*—McDermott Will & Emery LLP

(57) ABSTRACT

A hydraulic machine which can exchange hydraulic fluid pressure with rotational motion of an input/output means, having a radial arrangement of a plurality of hydraulic piston and cylinder assemblies about a crankshaft, the hydraulic cylinder and piston assemblies being longitudinally spaced along the crankshaft; and a means for varying eccentricity of the crankshaft whereby reciprocal motion of the pistons within the respective hydraulic cylinders is consequential to rotational motion of the crankshaft about the longitudinal axis of the crankshaft.

16 Claims, 12 Drawing Sheets

FIGURE 17
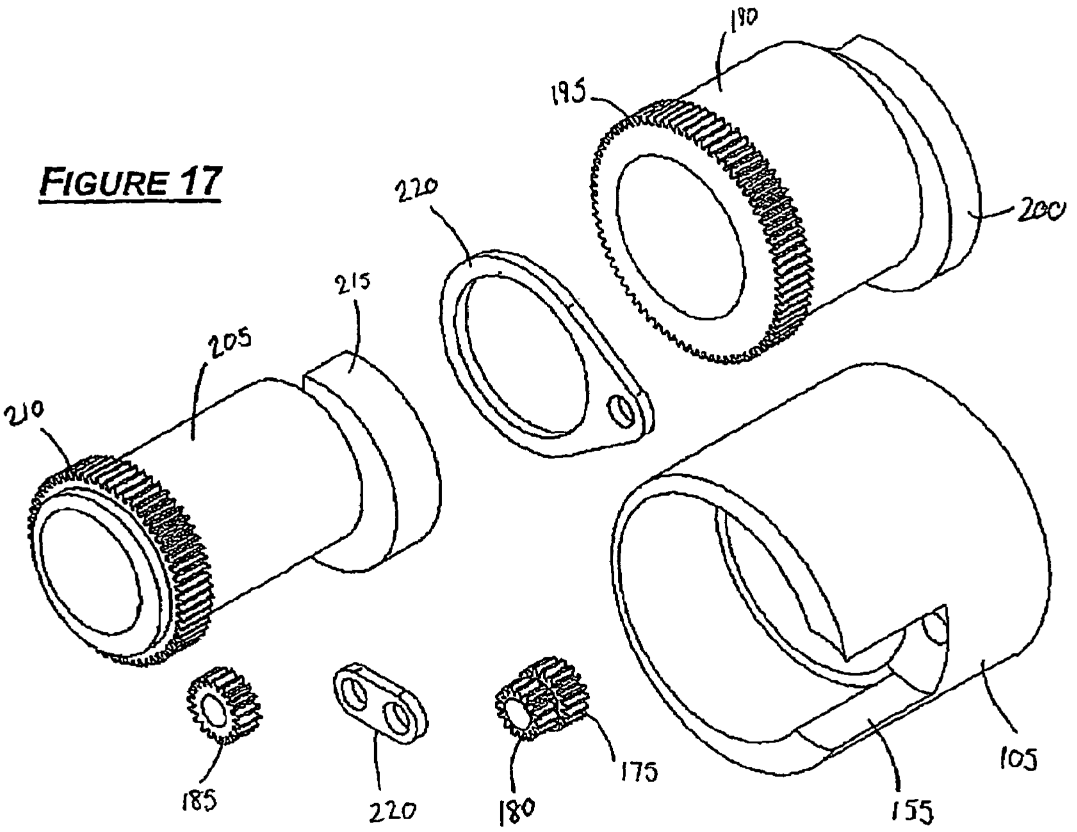
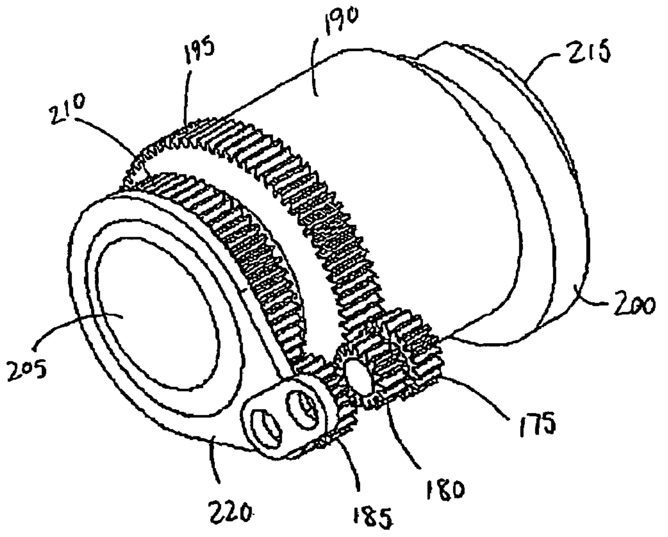
FIGURE 18

HYDRAULIC MOTOR/PUMP

RELATED APPLICATIONS

This application is the U.S. National Phase under 35 U.S.C. § 371 of International Application No. PCT/AU2004/001765, filed on Dec. 15, 2004, which in turn claims the benefit of Australian Application No. 2003906932, filed on Dec. 15, 2003, the disclosures of which Applications are incorporated by reference herein.

FIELD OF THE INVENTION

This invention relates to hydraulic motors/pumps, otherwise known as hydrostatic drives or hydraulic machines.

BACKGROUND TO THE INVENTION

Hydraulic pumps/motors have applications in many industries, including the material handling, mining and manufacturing industries.

A hydraulic motor/pump can be operated in one of two ways. In one mode of operation, the input medium is pressurised hydraulic fluid, and the output is rotational motion. The process can be reversed such that rotational motion is supplied to the hydraulic motor/pump. In this second mode of operation, the hydraulic fluid is pumped from the motor/pump.

An advantage of hydraulic motors/pumps is that they typically have an excellent overall efficiency, among many other desirable characteristics.

However, many hydraulic motors/pumps suffer from a distinct disadvantage. There exists a torque-speed trade off, such that as the motor speed increases the output torque decreases, and vice versa.

Prior art hydraulic motors/pumps typically have an eccentric disc which is connected to an output shaft. A set of hydraulic cylinder and piston assemblies are positioned in a radial (also known as a "star" or "fan") arrangement about the axis of rotation of the output shaft. Typically there are five such hydraulic cylinder assemblies.

The pistons intermittently exert a force to the edge of the eccentric disc in a coordinated fashion such that the disc is rotated. After exerting a force, the retraction of each piston is effected by the eccentric disc.

To vary the torque of the motor (in the driving mode of operation) some such motors have been fitted with a small piston between the output shaft and the centre of the eccentric disc. The eccentricity of the disc is varied by changing the length of small piston.

Similarly in a pumping mode of operation, the fluid flow rate and/or the output fluid pressure can be altered by changing the length of the small piston.

One disadvantage of such prior art hydraulic motors/pumps is that when the output shaft speed exceeds the fluid flow capabilities of the hydraulic cylinders, the pistons can dissociate from the eccentric disc. This can result in complete failure of the hydraulic motor/pump.

A further disadvantage of the prior art devices having a variable eccentric disc is that the possible range of eccentricity is limited. Typically a zero eccentricity situation is not possible.

A still further disadvantage is that the small piston can allow small unwanted perturbations of the eccentricity. These perturbations are the result of the fluid properties and the system elasticity.

With a high overall efficiency obtainable from hydraulic motors/pumps, there is a need for such a device which can simultaneously produces high torque at high speed.

SUMMARY OF THE INVENTION

According to the present invention there is provided a hydraulic machine which can exchange hydraulic fluid pressure with rotational motion of an output means, the hydraulic machine having a radial arrangement of a plurality of hydraulic piston and cylinder assemblies about at least one crankshaft coupled to the output means, the hydraulic cylinder and piston assemblies being longitudinally spaced along the crankshaft; and means for varying the eccentricity of the crankshaft.

Preferably, each piston is connected to the at least one crankshaft by a connecting rod.

Preferably, a spherical bearing is disposed between each connecting rod and the respective crankshaft.

Preferably, the eccentricity of the at least one crankshaft can be varied such that the stroke length of the pistons can be varied between zero and the maximum stroke length.

Preferably, the means for varying the eccentricity of the at least one crankshaft includes, located at each end of the at least one crankshaft:

an inner cylinder with a hollow eccentric cylindrical core within which the respective crankshaft is received such that the longitudinal axes of the inner cylinder and crankshaft are parallel and offset, an outer cylinder with a hollow eccentric cylindrical core within which the inner cylinder is received such that longitudinal axes of the outer cylinder and the inner cylinder are parallel and offset, a cylindrical main bearing with a concentric hollow cylindrical core within which the outer cylinder is received, and a drive means, wherein the drive means can be operated to simultaneously rotate the outer and inner cylinders to change the distance between the longitudinal axes of the main bearing and the crankshaft at both ends of the respective crankshaft.

Preferably, the drive means includes, at each end of at least one crankshaft:

a ring gear with teeth on both the inner and outer surfaces of the ring, a set of teeth around an end portion of each of the inner and outer cylinders, and a gear train to transfer rotation from the ring gear to the inner and outer cylinders, wherein the ring gear is supported by the respective main bearing, and the main bearing has a cut out portion through which the gear train extends to engage the ring gear.

Preferably, the main bearings have teeth on the outer surface, and the ring gears are disposed next to the teeth on the respective main bearing, and the drive means further includes:

a shaft with a helix formed on the shaft surface, and pinion gears which engage the teeth on each of the main bearings such that the shaft rotates with the main bearings;

at least one nut with an internal helix which engages the helix on the shaft, and at least one projection which is radial with respect to the shaft;

at least one hollow cylindrical outer sheath through which the shaft extends, the at least one sheath having two thin pinion gears at each end of the outer sheath, wherein each thin pinion gear engages a ring gear of the drive means, the at least one outer sheath having at least one longitudinal slot through which the at least one projection extends.

Preferably, the drive means is operated by moving the nut longitudinally along the shaft, the outer sheath can be rotated with respect to the shaft.

More preferably, moving the nut longitudinally advances or retards the ring gears with respect to the main bearings.

Preferably, both the inner and outer cylinders each have a counter weight.

Preferably, the hydraulic machine further includes at least one lay shaft having, for each of the main bearings, a pinion gear to engage the teeth on the respective main bearing.

Thus, the torque applied to each of the main bearings is transferred through the at least one lay shaft rather than being transferred through the crankshafts.

Preferably, the heads of the hydraulic cylinder and piston assemblies are supported by the housing such that the hydraulic cylinder and piston assemblies can oscillate as the respective crankshaft rotates.

Preferably, the head of each hydraulic cylinder and piston assembly is supported between a pair of thrust blocks which are supported by the housing.

Preferably, the heads of the hydraulic cylinder and piston assemblies have, at least partially, a spherical shape. More preferably, each pair of thrust blocks have a complimentary shape to the heads of the hydraulic cylinders.

Preferably, there are equal angles between the hydraulic cylinder and piston assemblies attached to each of the at least one crankshaft.

More preferably, there are five hydraulic cylinder and piston assemblies disposed at 72° intervals about the at least one crankshaft.

BRIEF DESCRIPTION OF THE DRAWINGS

In order that the invention can be more easily understood, an embodiment will now be described, by way of example only, with reference to the accompanying drawings, in which:

FIG. 17: is an exploded view of the inner and outer eccentrics and the gear train of the hydraulic machine;

FIG. 18: is a view of the assembled inner and outer eccentrics and the gear train, of FIG. 17;

DETAILED DESCRIPTION

FIGS. 1 to 6 illustrate a hydraulic machine 1 according to an embodiment of the present invention. The hydraulic machine 1 is encased in a housing 10. The hydraulic machine 1 has an power coupling 5 which can be connected to a complimentary power coupling to transfer rotational motion to or from the machine 1 about an axis of rotation (not shown).

Figure 2:
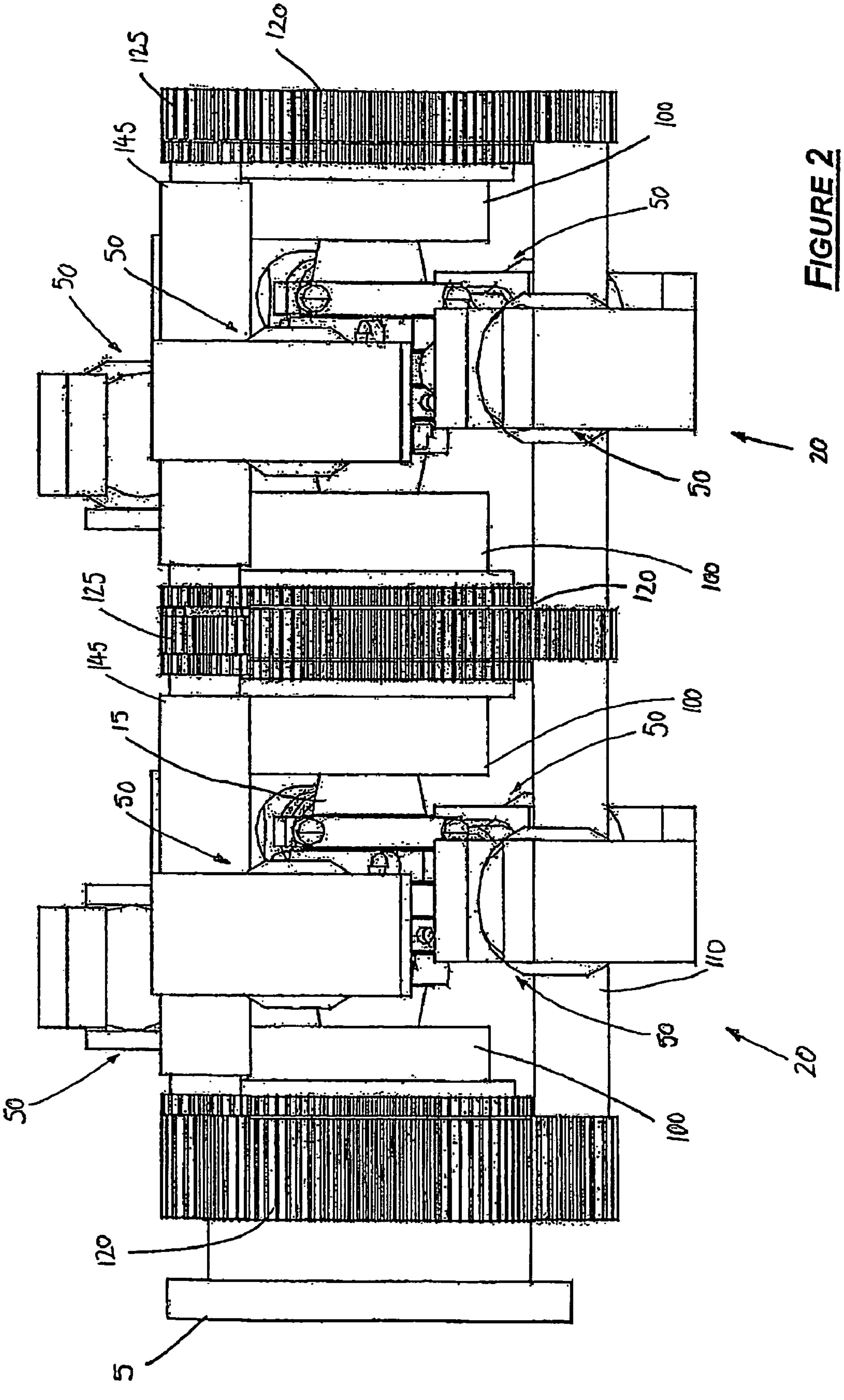
FIG. 2: is a plan view of the hydraulic machine shown in FIG. 1 with the housing removed.

FIG. 2 shows the hydraulic machine 1 with the housing 10 removed. The hydraulic machine 1 has two crankshafts 15, about each of which a bank 20 of five cylinder assemblies 50 are radially arranged. Thus, the hydraulic machine 1 in this embodiment has ten cylinder assemblies 50.

The hydraulic machine 1 can have any integer number of banks 20. Thus, the total number of cylinder assemblies 50 in a hydraulic machine 1 according to the invention is a multiple of the number of cylinder assemblies 50 per bank 20; such as five, ten, fifteen cylinder assemblies.

Figure 3:
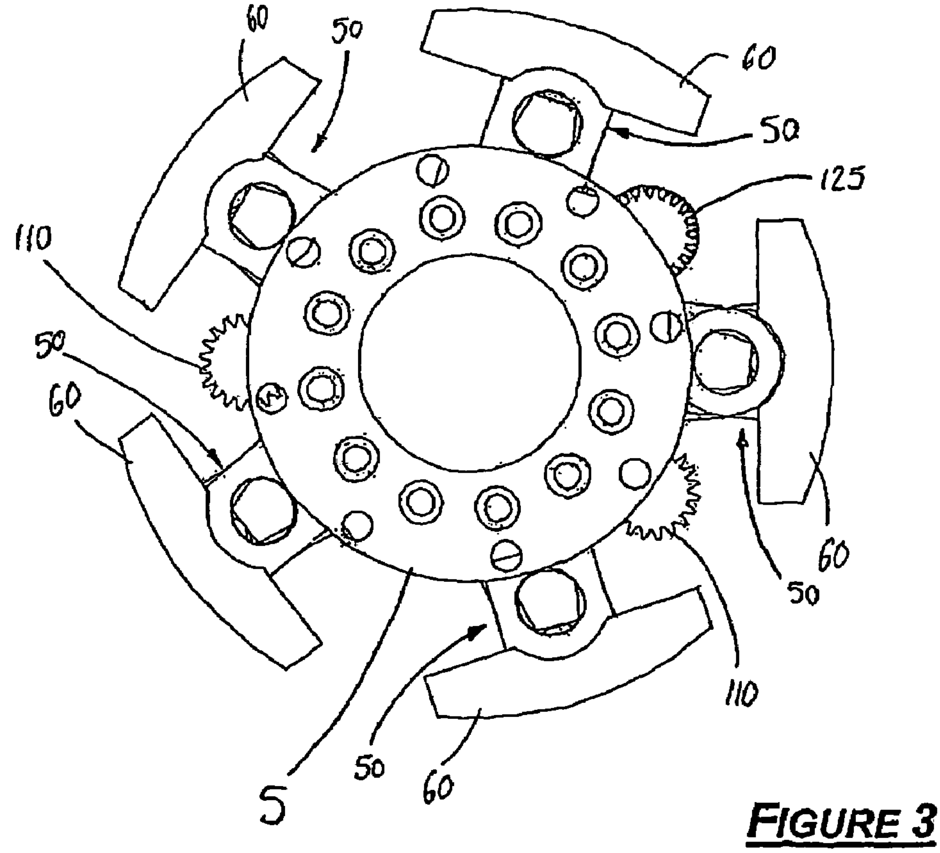
FIG. 3: is a view of the hydraulic machine shown in FIG. 2.
Figure 4:
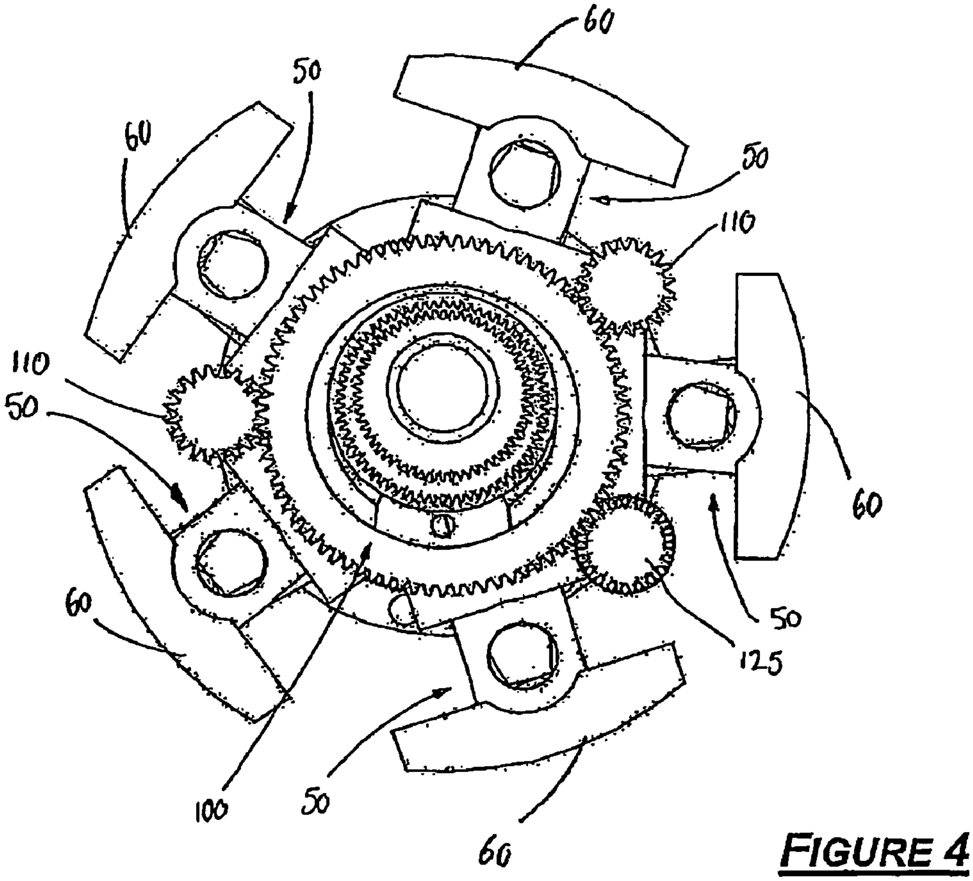
FIG. 4: is an end view of the hydraulic machine shown in FIG. 3 with the output flange removed.
Figure 5:
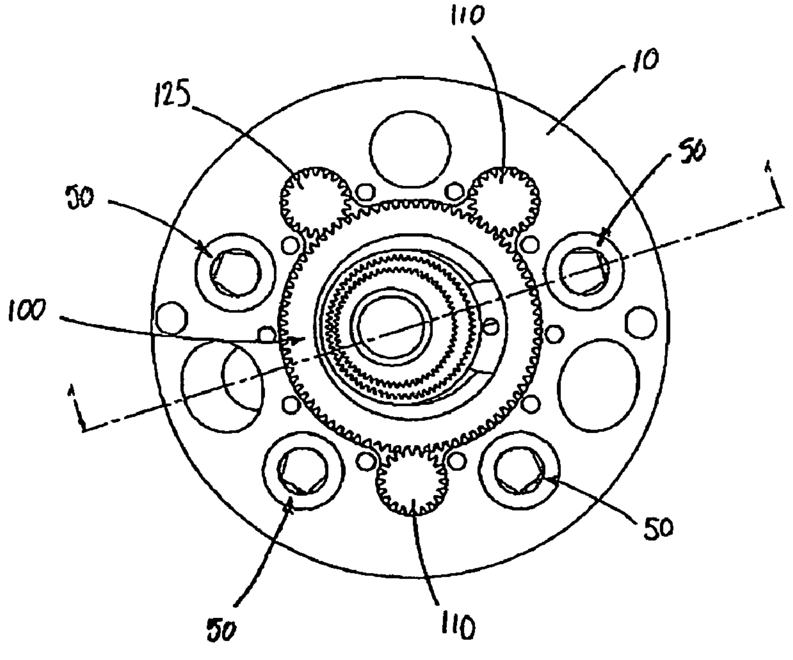
FIG. 5: is a sectional view of the hydraulic machine through the section B-B in FIG. 1.

FIGS. 3 to 5 are views of the hydraulic machine 1 as seen looking along the axis of rotation.

As can be seen in FIGS. 3 and 4, the five cylinder assemblies 50 of each bank 20 are arranged equiangularly about the axis of rotation. Thus when measured with respect to the axis of rotation, the angle between each adjacent pair of cylinder assemblies 50 is 72°.

Figure 6:
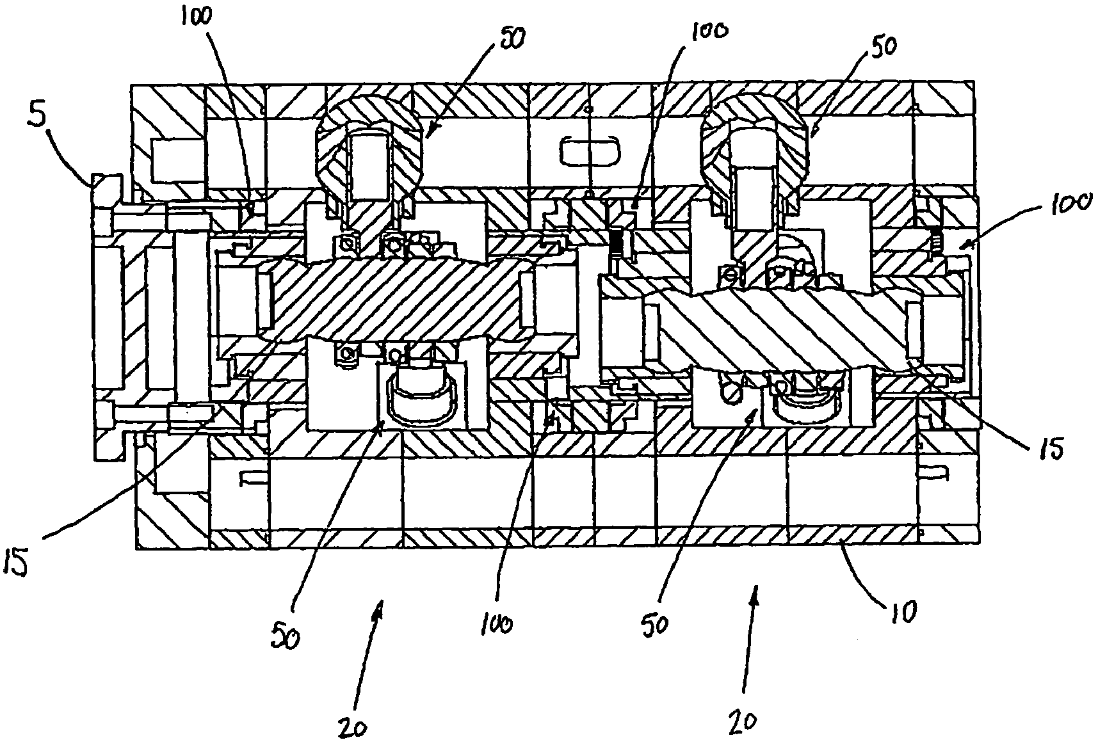
FIG. 6: is a sectional view of the hydraulic machine through the section A-A in FIG. 5.
Figure 7:
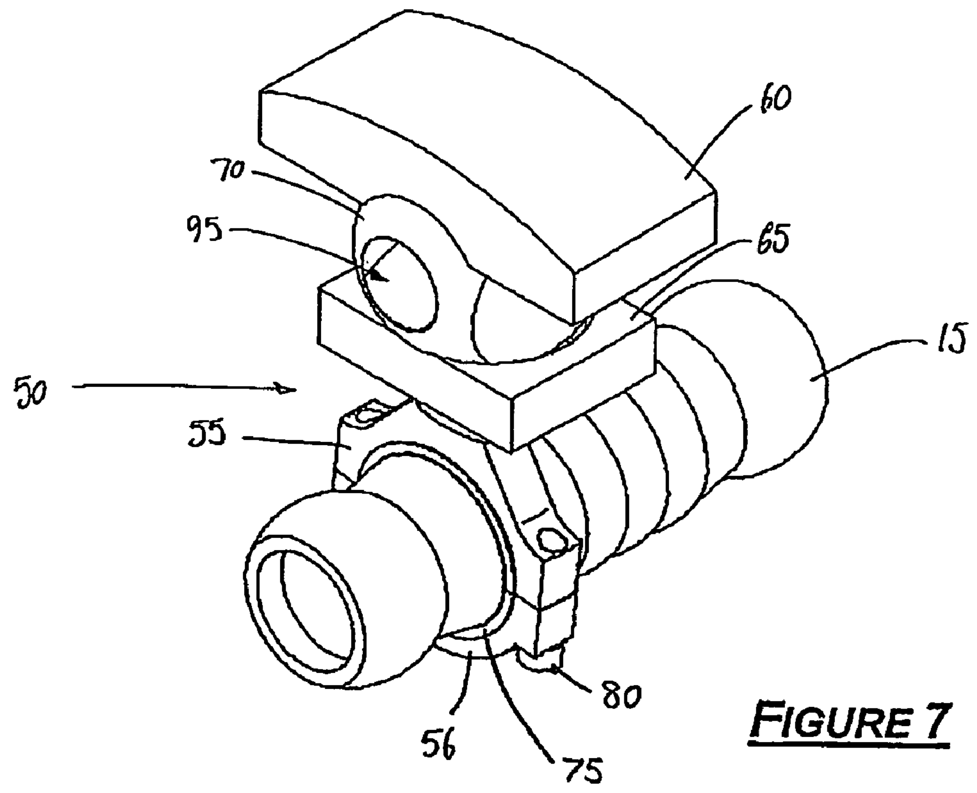
FIG. 7: is an axiomatic view of a crankshaft and cylinder unit and thrust block of the hydraulic machine.
Figure 8:
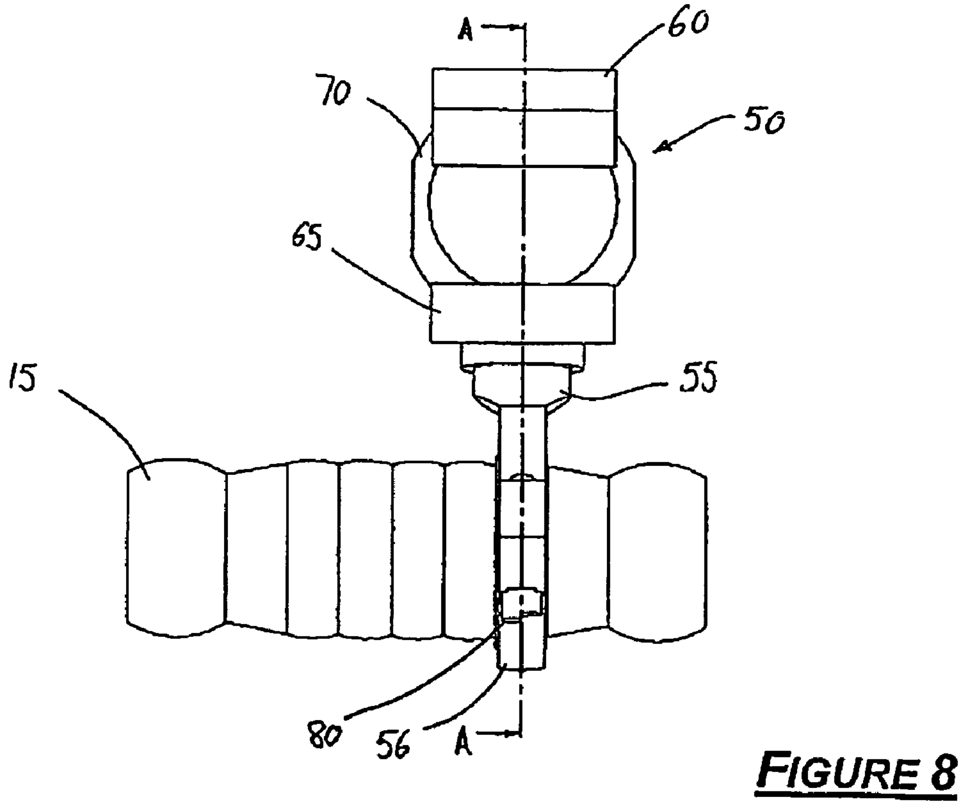
FIG. 8: is a side view of the crankshaft and cylinder unit and thrust block of FIG. 7.

FIGS. 2 and 6 show the hydraulic machine 1 in plan view such that the axis of rotation is in the plane of the page. Each cylinder assembly 50 is directly attached to its respective crankshafts 15 by a connecting rod 55. As there is a connecting rod 55 for each cylinder assembly 50, the cylinder assemblies 50 in each bank 20 are longitudinally offset with respect to the axis of rotation. Accordingly, the connecting rods 55 in each bank 20 are arranged in a side-by-side fashion along the respective crankshaft 15.

Figure 1:
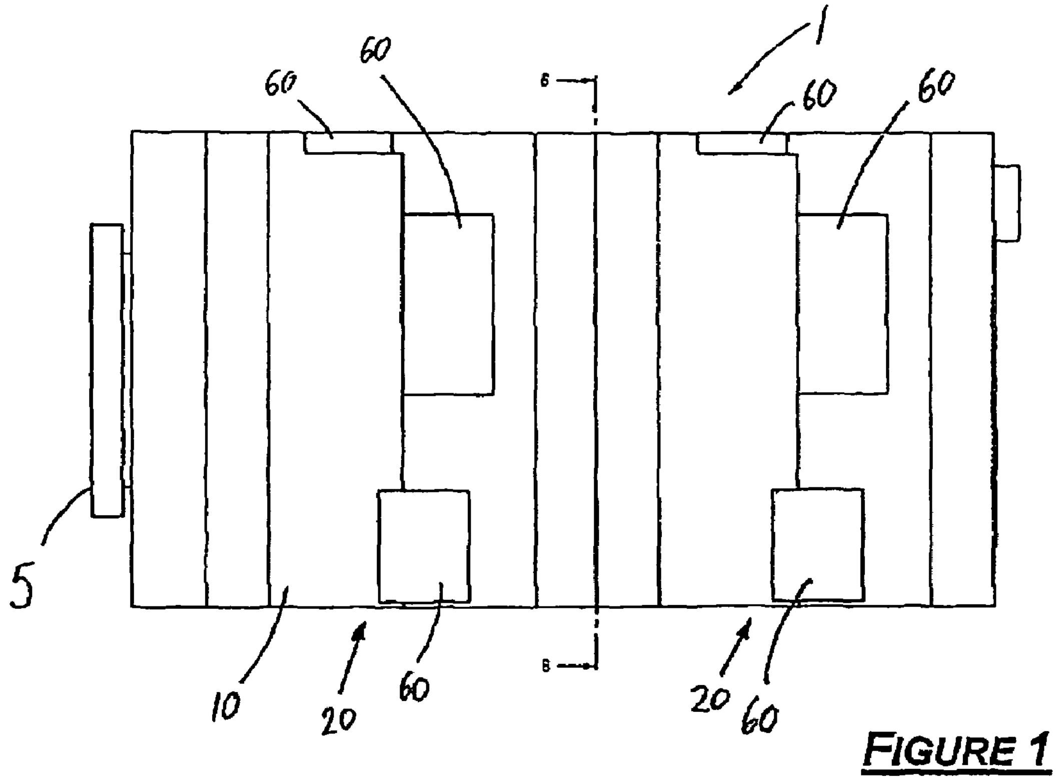
FIG. 1: is a plan view of the housing of a hydraulic machine according to an embodiment of the present invention.

FIG. 5 shows a sectional view of the hydraulic machine 1 as seen along the line B-B in FIG. 1. Thus, FIG. 5 shows an end view of a bank 20 of a hydraulic machine 1.

FIGS. 7 to 11 show various views of a cylinder assembly 50, and a crankshaft 15. The cylinder assembly 50 is one of the five cylinder assemblies in a bank 20.

Each cylinder assembly 50 is supported by an outer thrust block 60, and an inner thrust block 65. The thrust blocks 60, 65 are attached to the housing 10. The head 70 of each cylinder assembly 50 has a ball shape. The thrust blocks 60; 65 locate the head 70, while still allowing the cylinder head 70 to oscillate as the crankshaft 15 position changes.

A spherical bearing 75 is retained between a connecting rod 55 and the rod cap 56. The spherical bearing 75 surrounds the crankshaft 15, providing free relative rotational motion of the crankshaft 15 with respect to the connecting rod 55. The rod cap 56 is attached to the connecting rod 55 by two big end bolts 80.

By this arrangement, the piston 85 of each cylinder assembly 50 is positively attached to the crankshaft 15 by the connecting rod 55 and rod cap 56 arrangement. Thus, the speed range of the hydraulic motor is limited only by the flow characteristics of the hydraulic fluid.

Hydraulic fluid is supplied and removed from the cylinder head 70 via two fluid ports 95.

Figure 10:
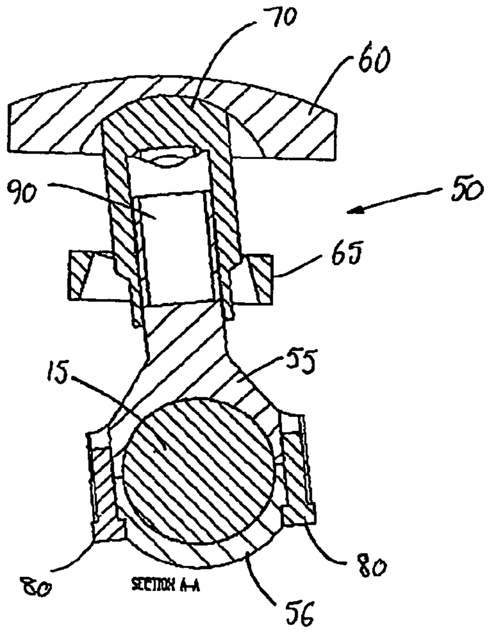
FIG. 10: is a sectional view of the crankshaft, connecting rod, cylinder unit and thrust block through the section A-A of FIG. 8.

FIG. 10 shows a cross section through a cylinder assembly 50. The piston 85 is directly attached to the connecting rod 55.

A gudgeon pin with a sufficient cross sectional area to handle the high forces cannot be arranged within cylinder since the cylinder bore is too narrow. Thus, to provide the angular movement required by the connecting rod 55, the cylinder head 70 has been designed with a ball shape.

The cylinder head 70 is retained between the outer and inner thrust blocks 60, 65. The surfaces 62, 67 of the thrust blocks 60, 65 are concave to complement the ball shape of the cylinder head 70. The cylinder head 70 is free to oscillate about an axis parallel to the longitudinal axis of the crankshaft 15.

Figure 9:
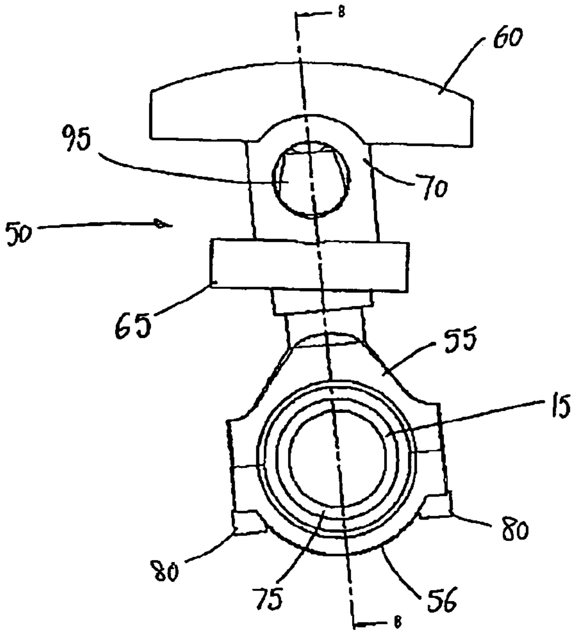
FIG. 9: is an end view of the crankshaft, connecting rod, cylinder unit and thrust block of FIG. 7.
Figure 11:
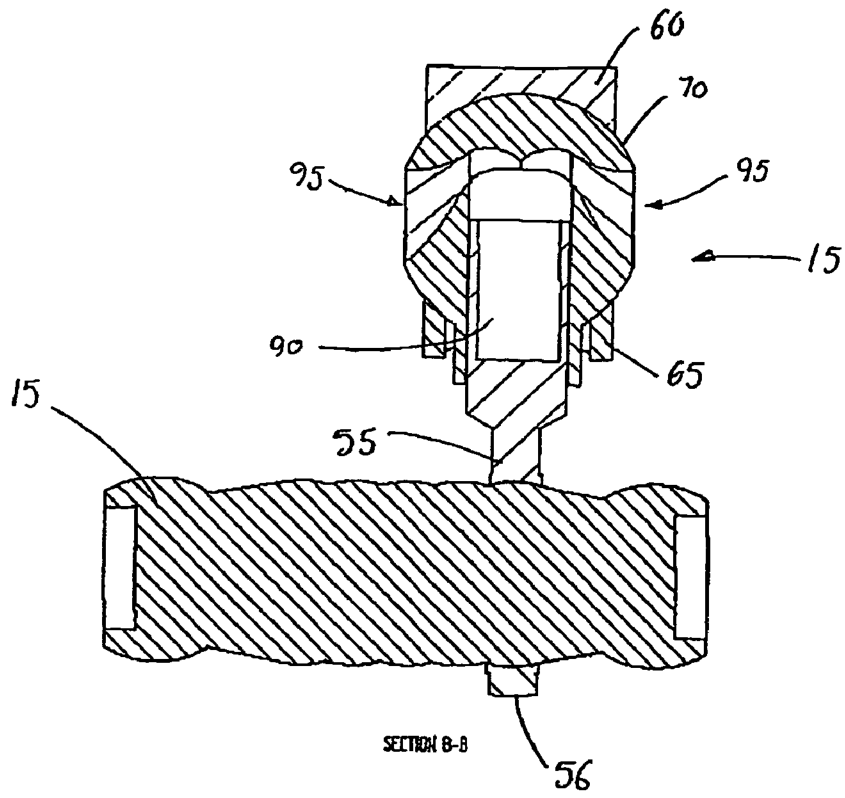
FIG. 11: is a sectional view of the crankshaft, connecting rod, cylinder unit and thrust block through the section B-B of FIG. 10.

FIG. 11 shows a cross-section through the crankshaft 15 and the cylinder assembly 50 along the line B-B of FIG. 9. Hydraulic fluid is introduced to, and expelled from, the cylinder assembly 50 via fluid ports 95.

Figure 12:
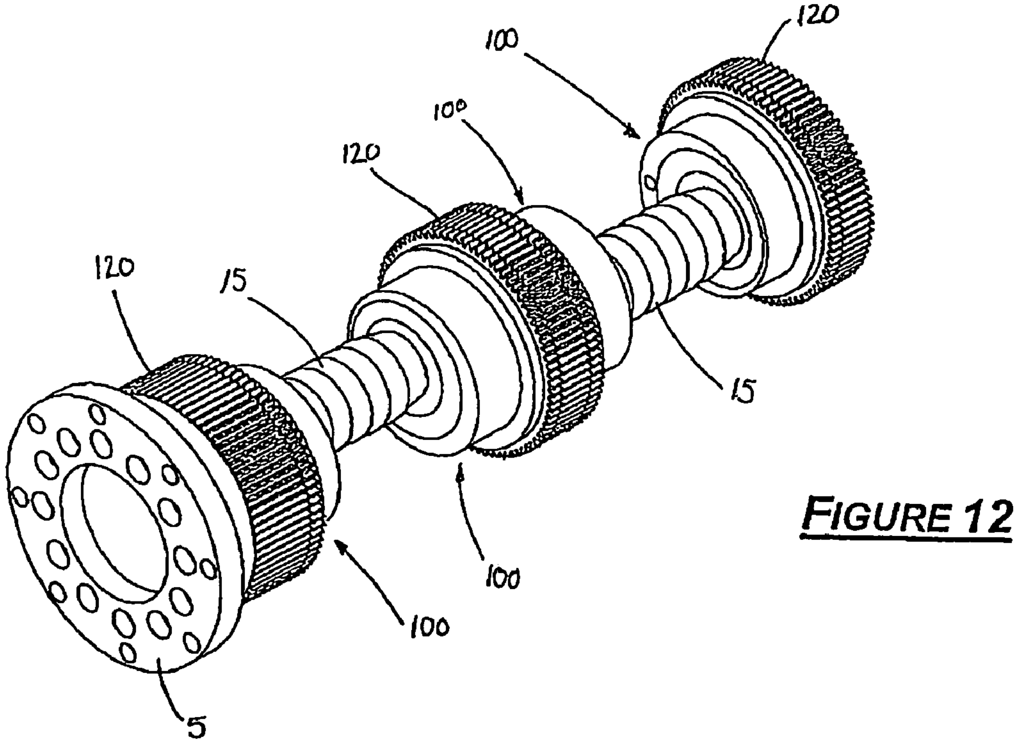
FIG. 12: is an axiomatic view of a crank assembly of the hydraulic machine.

FIG. 12 shows an power coupling 5 and a pair of crank assemblies 25. One crank assembly 25 is provided for each bank 20. A pair of stroke adjustment mechanisms 100 are also provided for each bank 20. The pair of stroke adjustment mechanisms 100 operate collaboratively to adjust the throw of the respective crankshaft 15. By adjusting the throw of the crankshafts 15, the hydraulic machine is provided with variable displacement. In other words, the swept volume can be increased or decreased by changing the stroke length of the cylinder assemblies 50. Thus, the hydraulic machine 1 has a stepless ratio transmission throughout the entire speed range.

Two main bearings 105 (one at each end of the crankshaft 15) contain the stroke adjustment mechanisms 100. Consequently, the main bearings 105 cannot be used to transmit torque.

Figure 13:
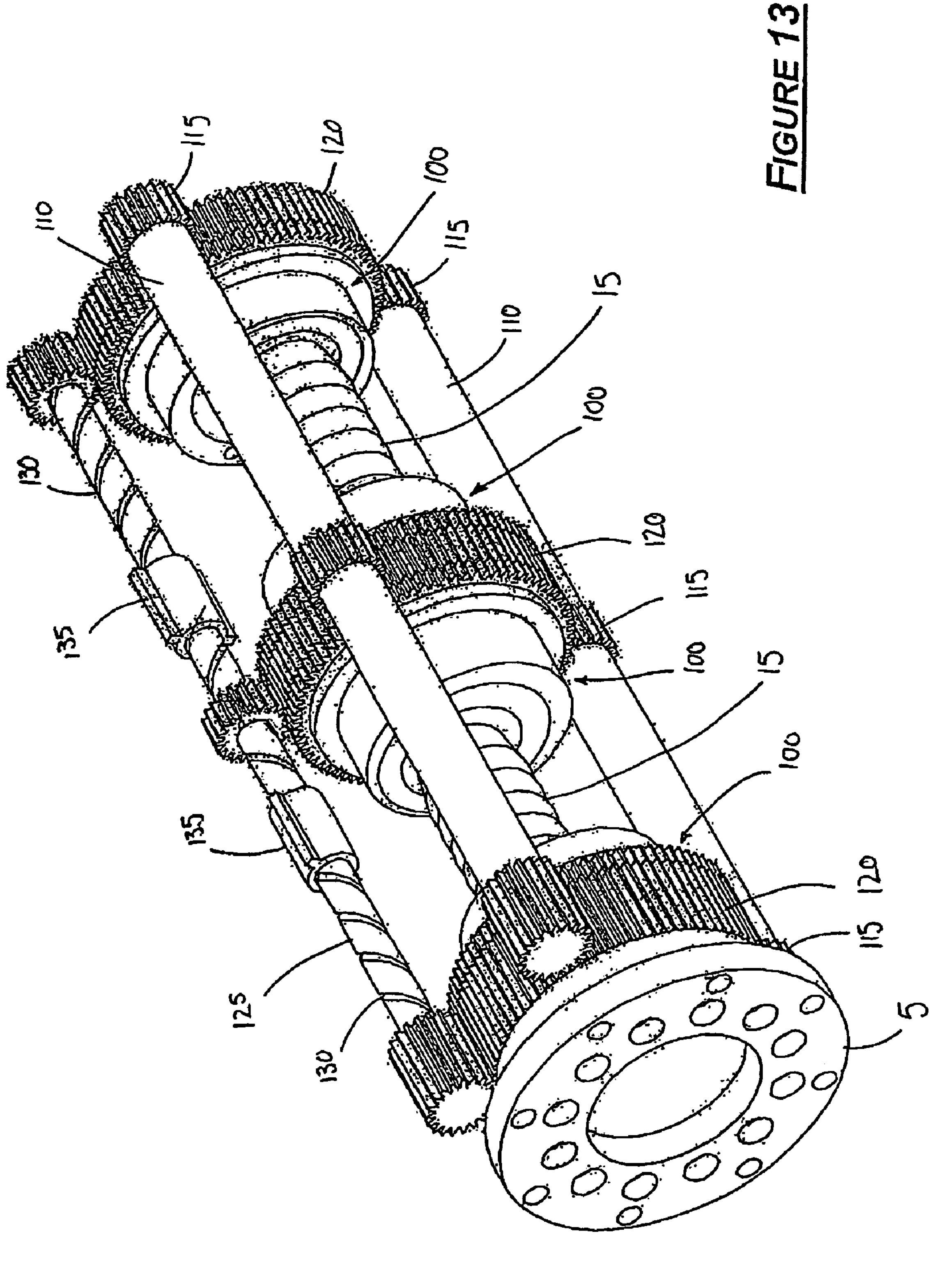
FIG. 13: is a view of the crank assembly of FIG. 12, with a pair of lay shafts and a helical shaft.

To transmit output or input torque (depending on the mode of operation of the hydraulic machine 1), it is necessary to collect the torque at each main bearing 105. This is achieved using lay shafts 110 (see FIG. 13). In the preferred embodiment, two lay shafts 110 are used.

The lay shafts 110 have pinion gears 115, each of which engage a bull gear 120 attached to each of the main bearings 105. The lay shafts 110 collect the torque from the bull gears 120, and also serve to maintain the synchronisation between the bull gears 120.

In order to control the stroke length of the pistons 85, a helical shaft 125 is coupled to the bull gears 120. The helical shaft 125 is not used to transmit torque, but remains in synchronisation with the bull gears 120.

Figure 14:
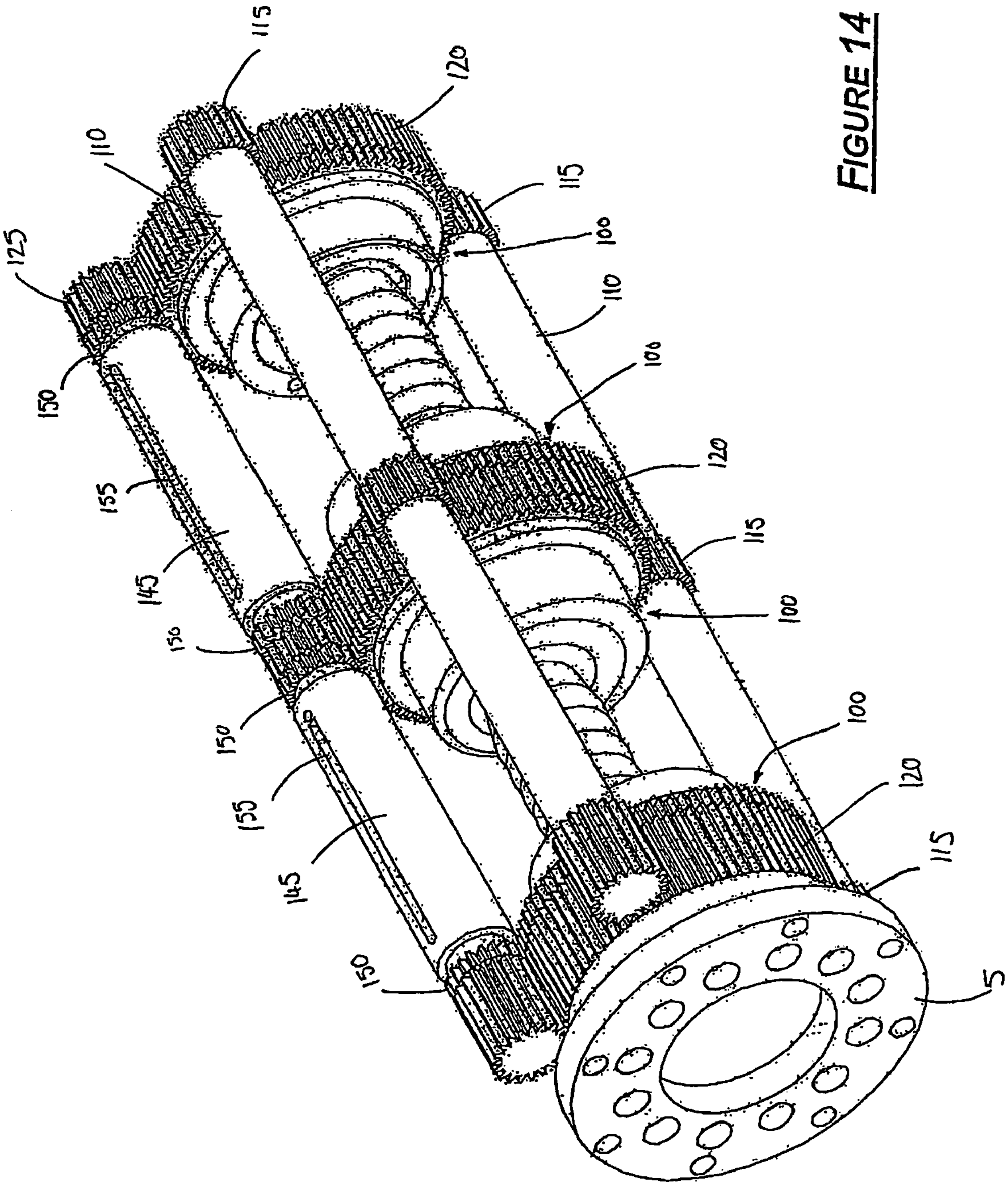
FIG. 14: is a view of the crank assembly of FIG. 13, with outer sheaths.
Figure 15:
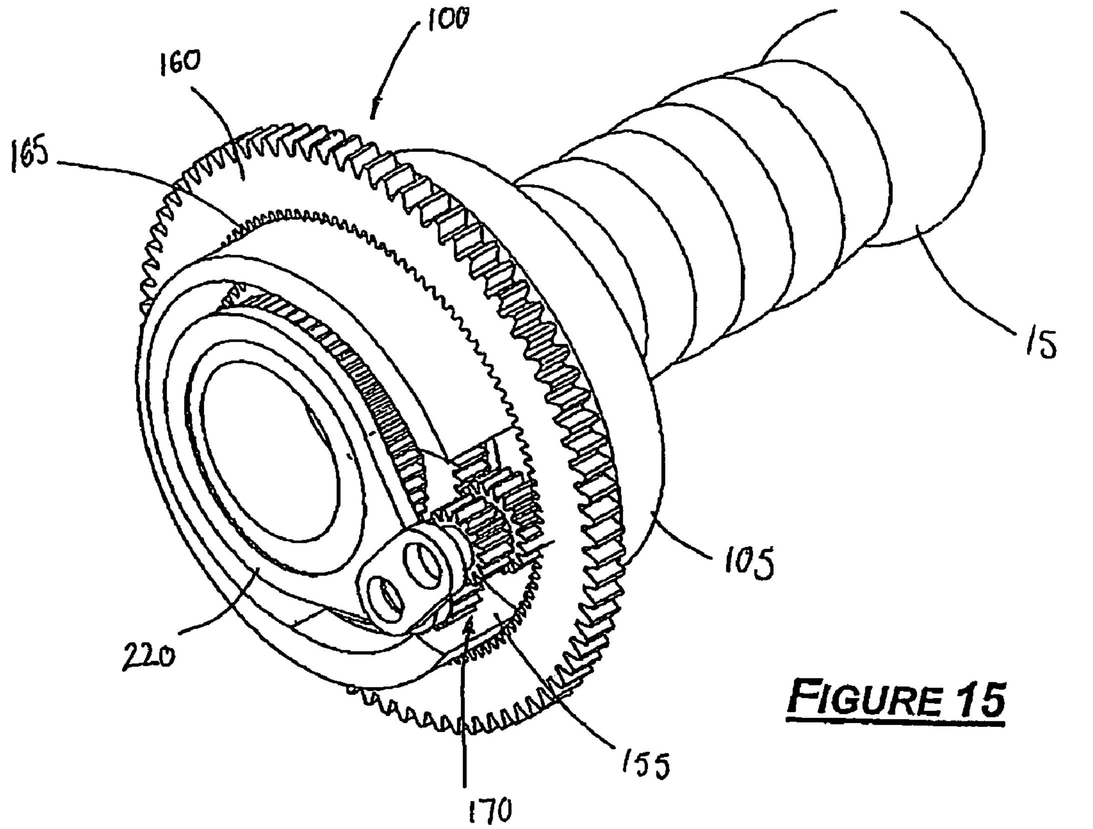
FIG. 15: is a view of the stroke adjustment assembly in FIG. 13.

For each bank 20 of cylinder assemblies 50, a helix 130 is formed on the helical shaft 125, and a helical nut 135 is fitted. The helical nuts 135 have projections 140. An outer sheath 145 is also provided for each bank 20 (see FIG. 14). Each outer sheath 145 has a thin pinion gear 150 at each end. The outer sheaths 145 surround the helical shaft 125.

The projections 140 engage slots 155 in the outer sheaths 145. As a helical nut 135 rotates as it is displaced longitudinally along the helical shaft 125. Hence, such longitudinal movement of the helical nut 135 causes the associated outer sheath 145 to rotate.

Each pinion gears 150 engages a ring gear 160 located adjacent to the bull gears 120, on the same side as the crankshaft 15. Each ring gear 160 is rotatable on its main bearing 105. As the helical nut 135 is moved longitudinally along the helical shaft 125, the two ring gears 160 of the respective bank 20 are rotated. This mechanism provides means to rotate the ring gears 160 while the hydraulic machine 1 is operating at any speed or load.

The ring gears 160 drive the stroke adjustment mechanisms 100. Thus, longitudinal movement of the helical nuts 135 provide means to drive the stroke adjustment mechanisms 100.

A stroke adjustment mechanism 100 is shown in FIGS. 15 to 20.

The main bearing 105 is a cylinder with the hollow cylindrical portion eccentrically positioned within the bearing 105. A pair of eccentric rings 190, 195 provide the actual stroke variation.

An outer eccentric ring 190 in the shape of a cylinder body with a hollow cylindrical portion. The diameter of the cylinder body of the outer eccentric ring 190 is geometrically dimensioned such that it is rotatably contained within the bore of the hollow portion of the main bearing 105.

A portion of the first end of the outer eccentric ring 190 is provided with a set of gear teeth 195. The other end is provided with a counter balance 200.

An inner eccentric ring 205 in the shape of a cylinder body with a hollow cylindrical portion. The diameter of the cylinder body of the inner eccentric ring 205 is geometrically dimensioned such that it is rotatably contained within the bore of the hollow portion of the outer eccentric ring 190.

A portion of the first end of the inner eccentric ring 20S is provided with a set of gear teeth 210. The other end is provided with a counter balance 215.

Each end of the crankshaft 15 is retained within the hollow portion of an inner eccentric ring 205. The throw of the crankshaft 15 is varied by moving the crankshaft 15 radially with respect to the respective main bearing 105. This radial movement is achieved by simultaneously rotating the outer eccentric ring 190 in a first direction and rotating the inner eccentric ring 205 in the opposite direction. The speed of rotation of the eccentric rings 190, 205 is the same.

There is a set of gear teeth 165 formed on the inner surface of each ring gear 160. The teeth 165 engage the teeth of the first primary gear 175 of a gear train 170. The first primary gear 175 engages the teeth 195 on the outer eccentric ring 190.

A second primary gear 180 is attached to the side of the first primary gear 175. The second primary gear 180 rotates with the first primary gear 175. A secondary gear 185 is positioned between the second primary gear 180 and the teeth 210 on the inner eccentric ring 205.

A gear train bearing 220 secures the gear train 170 in place. The main bearing 105 has a cut out section 106 through which the gear train 170 extends.

To ensure that the stroke adjustment mechanism 100 remains rotationally balanced, the counter balances 200, 215 rotate with the respective eccentric rings 190, 205. The counter balances 200, 215 cancel themselves out at zero stroke length, and work together at full stroke. The stroke adjustment mechanism 100, and thus the hydraulic machine 1 are always balanced.

Figure 16:
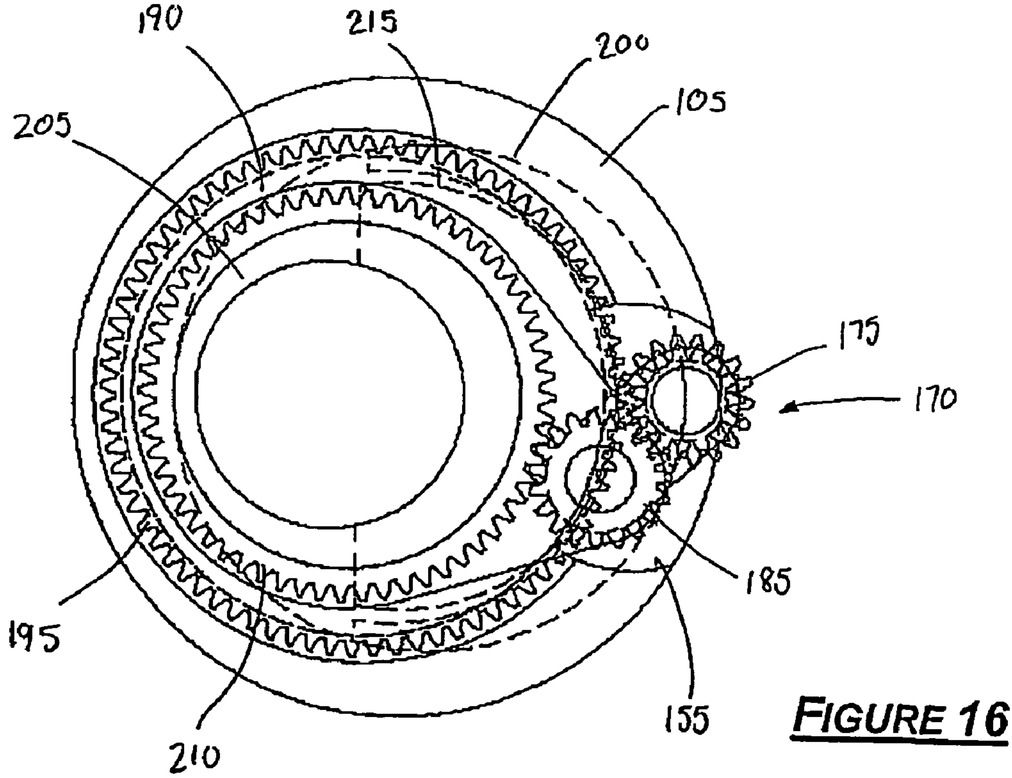
FIG. 16: is an end view of the inner and outer eccentrics and gear train of FIG. 15.

FIG. 16 shows a wire frame view of the main bearing 105, the outer and inner eccentric rings 190, 205 and the gear train 170. The counter balances 200, 215 are shown by the broken lines.

FIG. 17 is an exploded view of the stroke adjustment mechanism 100.

Figure 19:
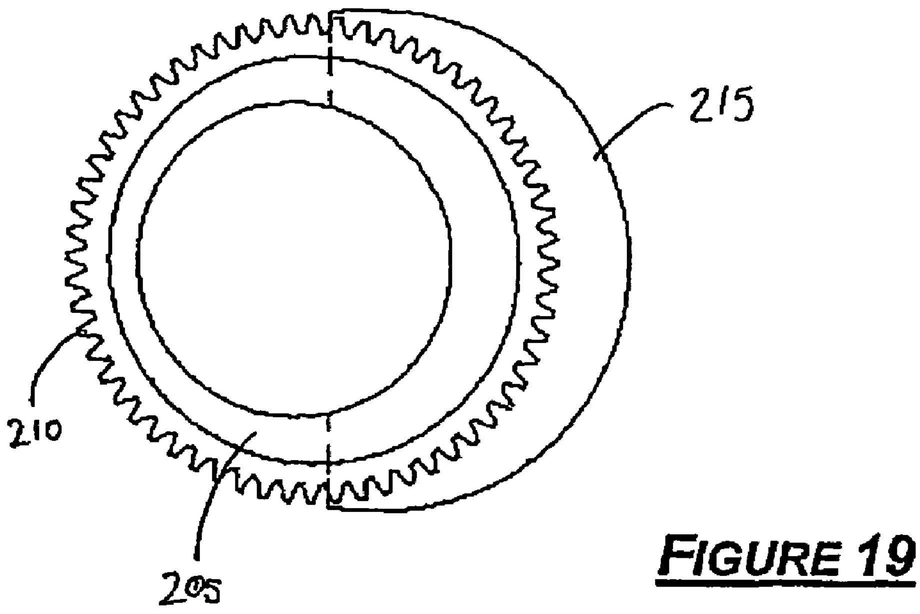
FIG. 19: is an end view of the inner eccentric ring.
Figure 20:
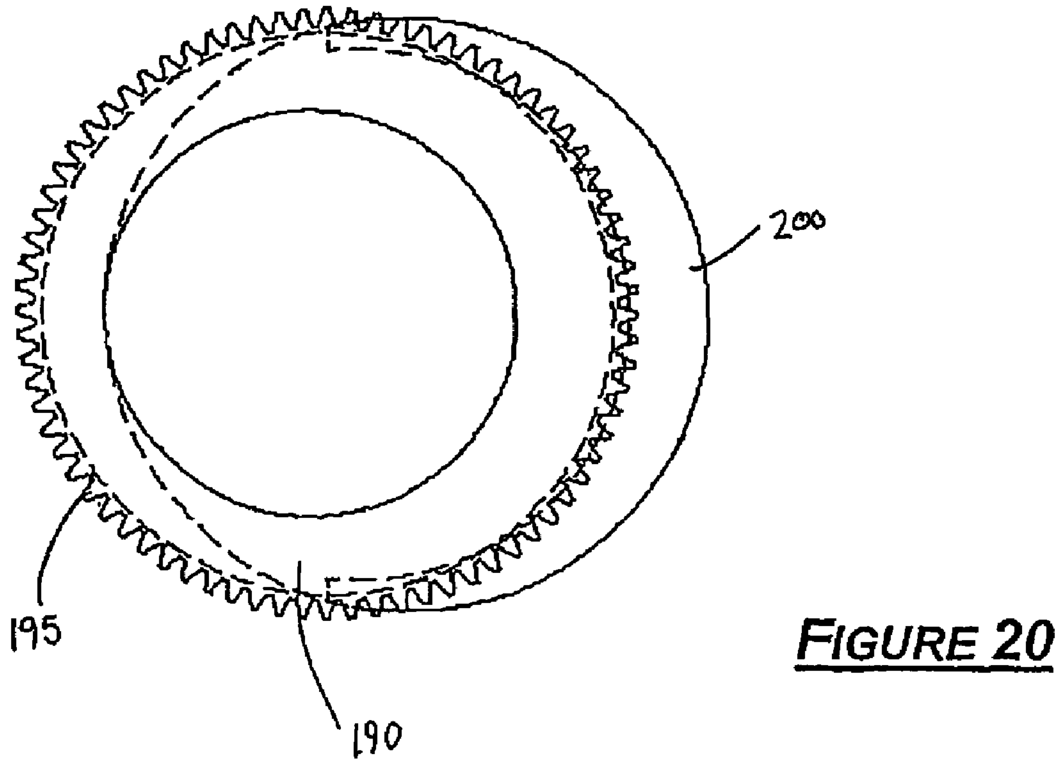
FIG. 20: is an end view of the outer eccentric ring.

FIGS. 18 to 20 illustrate the outer and inner eccentric rings 190, 205. FIG. 18 also shows the gear train 170.

When operating the hydraulic machine 1 as a motor, the five cylinder assemblies 50 in the respective bank 20 sequentially apply a force to the crankshaft 15, such that rotational motion is imparted to the crankshaft 15. The rotational motion is transferred through a bull gear 120 to the lay shafts 110.

When operating the hydraulic machine 1 as a pump, the power coupling 5 is rotated. The cylinders assemblies 50 are driven by the rotation of the crankshaft 15. Thus, hydraulic fluid is pumped from the machine 1.

It will be understood by persons skilled in the art of the invention that many modifications may be made without departing from the scope of the invention.

In the claims which follow and in the preceding description of the invention, except where the context requires otherwise due to express language or necessary implication, the word "comprise" or variations such as "comprises" or "comprising" is used in an inclusive sense, i.e. to specify the presence of the stated features but not to preclude the presence or addition of further features in various embodiments of the invention.

The invention claimed is:

1. A hydraulic machine which can exchange hydraulic fluid pressure with rotational motion of an output means, the hydraulic machine having a radial arrangement of a plurality of piston and a cylinder assemblies about at least one crankshaft coupled to the output means, the cylinder and piston assemblies being longitudinally spaced along the crankshaft; and means for varying the eccentricity of the crankshaft to cause the stroke length of the pistons to be varied between zero and the maximum length of the stroke.

2. The hydraulic machine according to claim 1, wherein each piston is connected to the crankshaft by a connecting road with a spherical bearing disposed between the connecting rod and the crankshaft.

3. The hydraulic machine according to either claim 1 or 2 wherein the means for varying the eccentricity of the crankshaft is located at each end of the crankshaft and includes:

an inner cylinder with a hollow eccentric cylindrical core within which the respective crankshaft is received such that the longitudinal axes of the inner cylinder and crankshaft are parallel and offset;

an outer cylinder with a hollow eccentric cylindrical core within which the inner cylinder is received such that longitudinal axes of the outer cylinder and inner cylinder are parallel and offset;

a cylindrical main bearing with a concentric hollow cylindrical core within which the outer cylinder is received; and a drive means, wherein the drive means can be operated to simultaneously rotate the outer and inner cylinders to change the distance between the longitudinal axes of the man bearing and the crankshaft at both ends of the respective crankshaft.

4. The hydraulic machine according to claim 3 wherein the drive means includes, at each end of the crankshaft:

a ring gear with teeth on both the inner and outer surfaces of the ring;

a set of teeth around an end portion of each of the inner and outer cylinders; and a gear train to transfer rotation from the ring gear to the inner and outer cylinders, wherein the ring gear is supported by the respective main bearing, and the main bearing has a cut out portion through which the gear train extends to engage the ring gear.

5. the hydraulic machine according to claim 4 wherein the main bearings have teeth on the outer surface, and the ring gears are disposed next to the teeth on the respective man bearing, and the drive mans further includes:

a shaft with a helix formed on the shaft surface and pinion gears which engage the teeth on each of the main bearings such that the shaft rotates with the main bearings;

at least one nut with an internal helix which engages the helix on the shaft and at least one projection which is radial with respect to the shaft;

at least one hollow cylindrical outer sheath through which the shaft extends, the at least one outer sheath having two thin pinion gears at each end thereof, wherein each thin pinion gear engages a ring gear of the drive means, the at least one outer sheath having at least one longitudinal slot through which the at least on projection extends.

6. The hydraulic machine according to claim 5 wherein the drive means is operated by moving the nut longitudinally along the shaft, and the outer sheath can be rotated with respect to the shaft.

7. The hydraulic machine according to claim 6 wherein moving the nut longitudinally advances or retards the ring gears with respect to the main bearing.

8. The hydraulic machine according to claim 7 wherein both the inner and outer cylinders having a counter weight.

9. The hydraulic machine according to either claim 1 or 2 including at least one lay shaft having, for each of the main bearings, a pinion gear to engage the teeth on the respective main bearing, whereby the torque applied to each of the main bearings is transferred through the at least one lay shaft rather than being transferred to the crankshaft.

10. The hydraulic machine according to claim 1 wherein the hydraulic piston and cylinder assemblies are supported by the housing such that the hydraulic piston and cylinder assemblies can oscillate as the respective crankshaft rotates.

11. The hydraulic machine according to claim 10 wherein the head of each hydraulic piston and cylinder assembly is supported between a pair of thrust blocks which are supported by the housing.

12. The hydraulic machine according to claim 11 wherein the heads of the hydraulic piston and cylinder assemblies have a spherical shape.

13. The hydraulic machine according to claim 10 wherein the heads of the hydraulic piston and cylinder assemblies have a partially spherical shape.

14. The hydraulic machine according to claim 12 or 13 wherein each pair of thrust blocks has a complementary shape to the heads of the cylinders of the hydraulic piston and cylinder assemblies.

15. The hydraulic machine according to either claim 1 or 2 wherein the hydraulic piston and cylinder assemblies are attached to the crankshaft with the same angle therebetween.

16. the hydraulic machine according to claim 15 wherein there are five hydraulic piston and cylinder assemblies disposed at 72° C. intervals about the crankshaft.

* * * * *